United States Patent [19]

Rowe et al.

[11] Patent Number: 4,562,699

[45] Date of Patent: Jan. 7, 1986

[54] MIXING CHAMBERS FOR CONTINUOUS FLOW ENGINES

[75] Inventors: Rodney A. Rowe; David S. Norbury, both of Bristol, England

[73] Assignee: Rolls-Royce Limited, Bristol, England

[21] Appl. No.: 232,673

[22] Filed: Oct. 22, 1962

[30] Foreign Application Priority Data

Oct. 23, 1961 [GB] United Kingdom ............... 37906/61

[51] Int. Cl.[4] ............................................... F23R 3/02
[52] U.S. Cl. ...................................... 60/759; 60/270.1
[58] Field of Search .............. 60/39.65, 39.72, 35.6 RJ, 60/270.1, 755, 757, 758, 759

[56] References Cited

U.S. PATENT DOCUMENTS

| | | | |
|---|---|---|---|
| 2,482,394 | 9/1949 | Wyman | 60/722 |
| 2,617,255 | 11/1952 | Niehus | 60/757 |
| 2,684,574 | 7/1954 | Marskell et al. | 60/757 |
| 2,841,954 | 7/1958 | Rainbow . | |
| 2,872,785 | 2/1959 | Barrett et al. | 60/270.1 |
| 2,920,448 | 1/1960 | Coanda . | |
| 2,929,203 | 3/1960 | Henning et al. | 60/39.25 |
| 2,941,362 | 6/1960 | Bailey . | |
| 3,102,392 | 9/1963 | Bauger et al. | 60/739 |

FOREIGN PATENT DOCUMENTS

| | | |
|---|---|---|
| 872417 | 4/1953 | Fed. Rep. of Germany . |
| 878584 | 6/1953 | Fed. Rep. of Germany . |
| 514961 | 3/1921 | France . |

Primary Examiner—Richard E. Schafer
Assistant Examiner—Maureen T. Ryan
Attorney, Agent, or Firm—Stevens, Davis, Miller & Mosher

[57] ABSTRACT

A combustion system comprising a tubular structure having an upstream end and defining within it a longitudinal passage. A tubular wall surrounding the structure and defining with the structure a further longitudinal passage, of annular cross section. The tubular structure having longitudinally extending, circumferentially spaced staves and longitudinally spaced coaxial hoops for the passage of fluid, the hoops being shaped to deflect substantially axially flowing fluid either inwards or outwards through the openings for discharge either inside or outside the assembly respectively.

5 Claims, 4 Drawing Figures

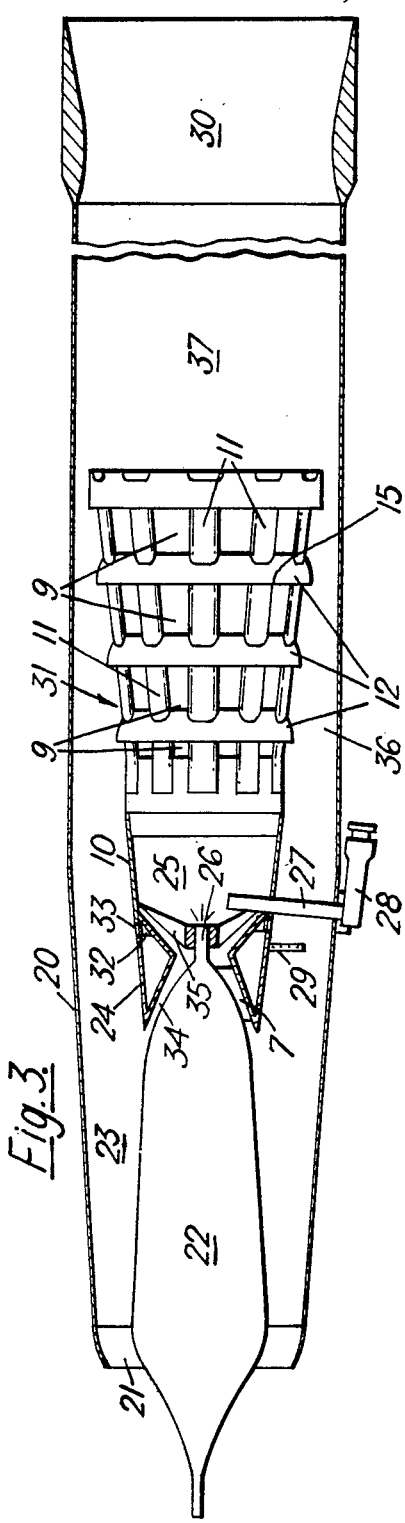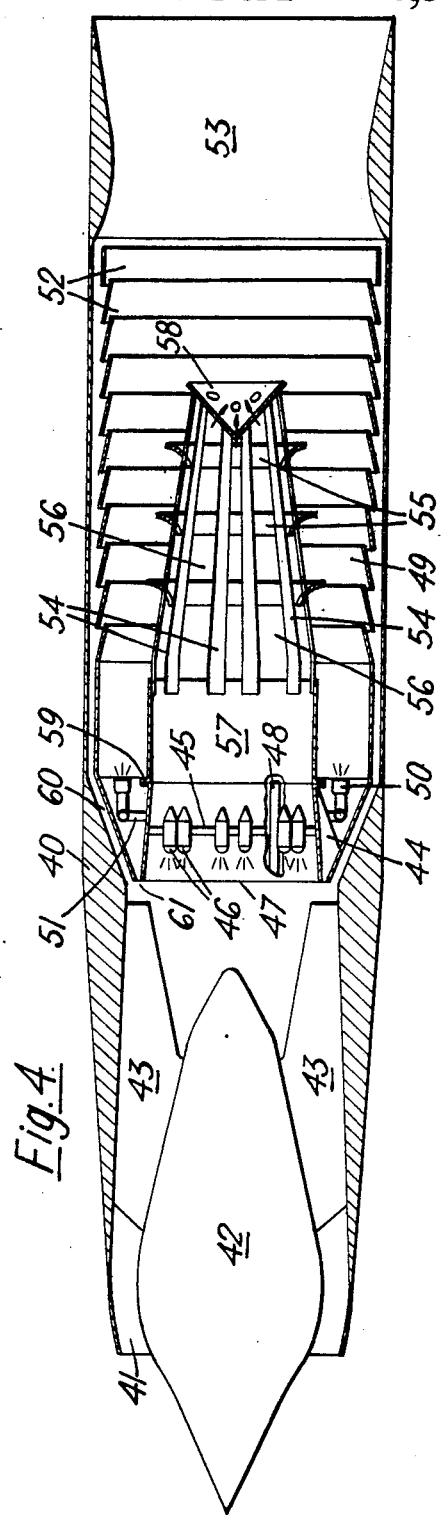

MIXING CHAMBERS FOR CONTINUOUS FLOW ENGINES

This invention relates to the construction of mixing chambers for use in the combustion systems of ramjet and other internal combustion continuous flow engines.

In one form of the invention the mixing chamber constitutes a flame tube in which combustion of air with liquid (or vaporised) fuel is to take place, and in another form of the invention the mixing chamber is used to receive air and liquid (or vaporised) fuel and to deliver the mixture of air and fuel to an annular space formed between the mixing chamber and a surrounding duct.

According to the invention the mixing chamber comprises a tubular assembly of longitudinally extending, circumferentially spaced staves and longitudinally spaced coaxial hoops attached to the staves and defining with the staves a number of openings for the passage of fluid, the hoops being shaped to deflect substantially axially flowing fluid either inwards or outwards through the openings for discharge either inside or outside the assembly respectively.

The hoops are shaped according to the purpose of the mixing chamber, to suit flow either inwards or outwards through the openings in any given construction of chamber.

The hoops are preferably of concave cross-section having their intake edges offset radially from the assembly of staves so that the hoops act as scoops.

The staves are preferably at least partly of trough cross-section with their concave faces on the same side of the assembly of staves as the discharge edges of the hoops.

By way of example two embodiments of the invention will now be described with reference to the annexed drawings, of which:

FIG. 3 is, on a smaller scale, a diagrammatic longitudinal section of a ramjet engine provided with the mixing chamber of FIGS. 1 and 2, the mixing chamber itself being shown in elevation; and FIG. 4 is a diagrammatic longitudinal section of a different ramjet engine provided with another form of mixing chamber, in this case shown in section.

Figure 1:
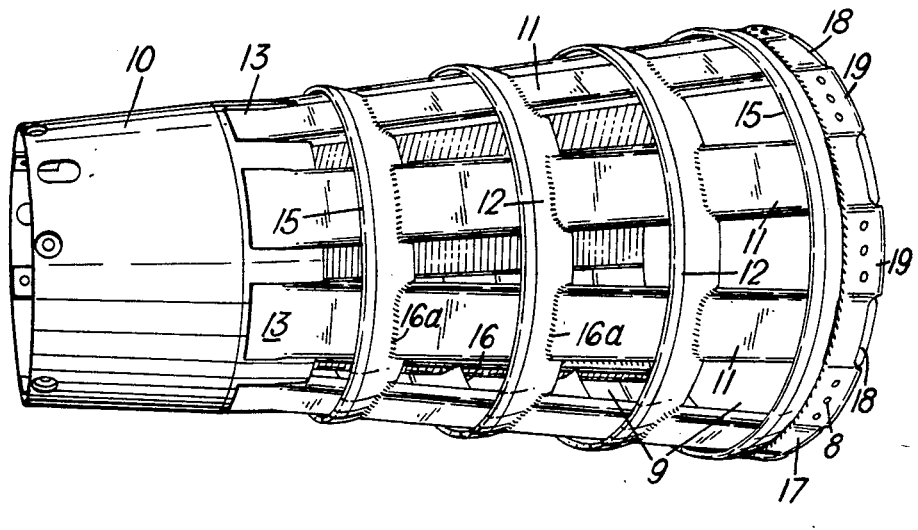
FIGS. 1 and 2 are respectively a perspective side view and a rear end view of one form of mixing chamber.
Figure 2:
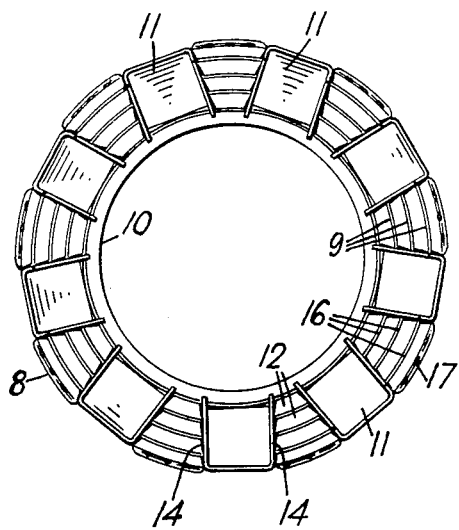

In FIGS. 1 and 2 the mixing chamber, which is designed for use as a flame tube, comprises at its forward upstream end a tubular attachment member 10 from which extend downstream a circumferentially spaced series of diverging sheet metal staves 11 surrounded by a plurality of longitudinally-spaced co-axial hoops 12. The staves have upstream end portions 13 which are arcuate in cross-section to match the curvature of the attachment member 10, to which they are welded. Downstream of the attachment member the staves are progressively shaped to have a shallow trough cross-section with the walls 14 of the trough extending inwards. It will be seen that the hoops co-operate with the sheet metal trough walls of the divergent staves to define nozzle openings of progressively increasing size, whose length in the radial direction is appreciably greater than the thickness of the sheet metal forming the staves. In this way the combination of hoops and trough walls provides nozzles of sufficient length to provide good control over their direction of discharge.

The annular hoops 12 are of curved cross-section, concave inwards, and have intake edges which are provided with rounded lips 15 and offset radially outwards from the assembly of staves 11 so that the hoops form scoops for interception and deflection of an external flow of air/fuel mixture into the combustion chamber through openings 9 defined by the staves and hoops. The discharge edges 16 of the hoops project slightly inwards into the assembly of staves but do not project more than the trough walls 14 of the staves. The hoops are formed with cut-outs 16a through which pass the staves, the latter being welded to the hoops. The downstream end hoop has welded thereto a surrounding skirt 17 formed with circumferentially-spaced slots 18 which are located opposite the adjacent ends of the staves. Those sections of the skirt which lie between the slots 18 and therefore between the staves 11 form tongues 19 which are offset inwards to lie each between adjacent walls 14 of adjacent staves. The skirt 17 is also formed with holes 8 to permit cooling air to reach the extrados of the end hoop.

In FIG. 3, the principal parts of the ramjet engine are indicated in outline, with most of the accessories omitted. The engine comprises a casing 20 having an intake 21 containing a pointed centre body 22 supported from the casing by radial vanes 23, an annular shroud 24 supported from the casing by the vanes 23 and from the rear end of the centre body by vanes 7, a pilot combustion chamber 25 containing a fuel injector 26 and a flame projection tube 27 which is associated with an electrically operated pyrotechnic igniter 28, a circumferentially-spaced series of main fuel injectors in the form of radial pipes 29 perforated for discharge in a transverse direction from a radial series of orifices, and a propulsion nozzle 30. In accordance with the invention the engine is provided with a mixing chamber in the form of a combustion chamber 31 as illustrated in FIGS. 1 and 2, of which the attachment member 10 overlaps the pilot combustion chamber 25 to be secured by a ring of radial bolts (not shown) which pass through holes in the attachment member to enter bosses 32 mounted on the shroud 24, recesses 33 being provided in the shroud outer wall for the bolt heads. In this manner the chamber 31 is mounted in cantilever fashion from its upstream end.

Air entering the intake 21 passes around the centre body 22 and is then split by the shroud 24 into two streams, viz., a minor inner stream which passes through the annular passage 34 and swirl vanes 35 to enter the pilot chamber 25, and a major outer stream which flows along the annular space 36 outside the combustion chamber and within the engine casing 20.

In operation, the mixture of air and fuel ignited in the pilot chamber 25 provides a flaming discharge which enters the chamber 31 where it is fed from the space 36 with air mixed with fuel supplied from the main injectors 29, the mixture being deflected by the inlet edges of the hoops 12 to enter the chamber 31 through the openings 9. The relatively small outer portion of the air and fuel passing through the annular space 36 which is not deflected into the chamber 31 flows onwards to enter the main combustion section 37 downstream of the chamber 31 as a sheath where it mixes relatively slowly with the main combustion gases, thus affording thermal protection to the walls of the section 37. The combustion gases are then discharged through the nozzle 30 as a propulsive jet.

The construction of the chamber 31 offers the following advantages. The concave hoops not only act as scoops to provide a more positive deflection and a better inward radial penetration of the air/fuel mixture into the chamber 31 than is achieved by the use of mere perforations in a chamber wall, but they completely intercept the boundary layer of the mixture flowing along outside the wall of the chamber and deflect it into the chamber, thus preventing the boundary layer from getting too hot due to prolonged flow along the chamber wall and thus also promoting cooling of the staves by the external flow of fuel/air mixture. The shape of the hoops reduces eddy formation from the flow passing over the extrados. Finally, the complete annular scoops 12 with their substantial intake portions lying in the relatively cold air stream flowing through space 36 confer considerable hoop strength on the chamber 31.

The width of the staves and their trough cross-section is so designed that sheltered zones adjacent to the troughs are provided for vortices formed between the flows through circumferentially adjacent openings 9, which vortices assist intermingling within the chamber 31.

The total area of the openings 9 and the discharge outlet of the chamber 31 is preferably approximately equal to the cross-sectional area of the flow passage bounded by the casing 20 at the region of that outlet.

The ramjet engine in FIG. 4 is shown in outline with most of the accessories omitted. The engine comprises a casing 40 having an intake 41 with a pointed centre body 42, supported from the casing by radial vanes 43, an annular shroud 44 supported by vanes (not shown) from the casing, and a fuel manifold 45 on which are mounted a circular series of main sprayers 46 for injecting liquid fuel in an upstream direction into a central duct 47. There is also a flame projection tube 48 associated with electrically-operated pyrotechnic igniters (not shown), which is arranged to project a flame jet into an annular pilot combustion space 49 (the wall of the duct 47 being broken away in FIG. 4 to make the flame projection tube 48 visible), a circular series of pilot sprayers 50 mounted on a fuel manifold 51 within the shroud 44 for injecting liquid fuel into the annular space 49, heat shielding in the form of a longitudinal series of co-axial overlapping rings 52, and a propulsion nozzle 53. In accordance with the invention the engine is provided with a mixing chamber comprising a tubular assembly of trough-section staves and concave-section hoops 55 welded together, which between them define openings 56 for the escape of fuel/air mixture outwards into the annular space 49. The mixing chamber is provided at its upstream end with a tubular attachment member 57 to which the upstream ends of the staves 54 are welded and at its downstream end with a frusto-conical end plate 58 having a small central outlet and also a number of outlet holes in its walls. The downstream ends of the staves are welded to the end plate 58. The attachment member has a flange 59 bolted to an adjacent flange on the downstream end of the shroud 44, so that the mixing chamber is supported in cantilever fashion from its upstream end.

In this form of mixing chamber the troughs of the staves face outwards whilst the inlet edges of the concave-section hoops are offset inwards into the mixing chamber.

In operation, air entering the intake 41 passes around the centre body 42 and is then split by the wall of duct 47 into two streams, viz. an inner major stream which enters the duct 47, and an outer minor stream which in turn is divided, part passing through an annular passage 60 to cool the heat shield 52 and part passing through holes 61 in the shroud 44 to enter the pilot combustion space 49, where it is mixed with fuel from sprayers 50 and ignited by the flame from the projection tube 48. The air entering the duct 47 picks up fuel from the main sprayers 46, and the resultant air/fuel mixture then enters the mixing chamber where most of it is deflected outwards by the hoops 55 into the ignited gas in the annular combustion space 49 surrounding the mixing chamber. Combustion of the deflected mixture then takes place in the annular space 49 and downstream of the mixing chamber.

A flame stabilising zone is formed immediately downstream of the end plate 58, this zone being fed with air/fuel mixture both through the central outlet of the end plate 58 and through the outlets in its wall, the jets through these outlets impinging on one another to create a vortex and being ignited by the surrounding hot gases to form a stabilised flame which extends axially downstream.

In this form of mixing chamber, the hoops scoop out the unburnt air/fuel mixture and direct it transversely outwards across the combustion space, thus providing a rapid rate of radial penetration by the injected mixture and providing a large angle of flame spread relative to the axial direction.

We claim:

1. A combustion system comprising a tubular structure having an upstream end and defining within it a longitudinal passage, and a tubular wall surrounding the structure and defining with the structure a further longitudinal passage, of annular cross section, means for introducing a minor flow of combustible fluid mixture into a first one of the passages at the upstream end of the structure and for igniting that minor flow, and means for introducing a major flow of combustible fluid mixture into a second one of the passages at the upstream end of the structure, the structure consisting of a plurality of longitudinally extending, circumferentially spaced staves and longitudinally spaced coaxial hoops attached to the staves and defining with the staves a number of openings for the passage of fluid, the staves being each of channel section presenting a longitudinally continuous trough towards the first passage, and a substantially flat face towards the second passage, and the hoops being each substantially frusto-conical, with a first edge which is nearer the upstream end and radially offset towards the second passage relatively to the flat faces of the staves, and a second edge which is further from the upstream end and from the second passage, whereby the hoops deflect successive boundary layer portions of the major flow of combustible fluid mixture from the second passage through the openings as jets which penetrate into the first passage, and the troughs of the staves define sheltered zones for longitudinal propagation of flame from the minor flow of combustible fluid to all the jets.

2. A combustion system according to claim 1, in which each hoop has a circumferentially continuous first edge.

3. A combustion system according to claim 1, in which each hoop is concavo-convex in cross section.

4. A combustion system according to claim 1, in which the second passage is that passage which is between the tubular structure and the wall, and the hoops deflect the boundary layer portions obliquely inwards.

5. A combustion system according to claim 4, in which the hoops increase successively in diameter away from the upstream end of the structure.

* * * * *